United States Patent [19]

Newman et al.

[11] Patent Number: 5,116,136

[45] Date of Patent: May 26, 1992

[54] TEMPERATURE MEASUREMENTS USING THERMISTOR ELEMENTS

[75] Inventors: William H. Newman, Brookline, Mass.; Ralph G. Burgess, Hudson, N.H.

[73] Assignee: Massachusetts Institute of Technology, Cambridge, Mass.

[21] Appl. No.: 359,954

[22] Filed: Jun. 1, 1989

[51] Int. Cl.$^5$ ............ G01K 3/00; G01K 7/24
[52] U.S. Cl. ............ 374/102; 307/310; 364/557; 374/170; 374/134
[58] Field of Search ............ 374/102, 112, 169, 183, 374/173, 134; 324/132, 602; 328/145; 338/89; 364/557

[56] References Cited

U.S. PATENT DOCUMENTS

| | | | |
|---|---|---|---|
| Re. 30,597 | 1/1981 | Grindheim | 374/173 |
| Re. 33,119 | 11/1984 | Baker | 374/102 |
| 2,423,463 | 7/1947 | Moore | 338/89 X |
| 2,757,281 | 7/1956 | Le Bel | 324/132 X |
| 3,284,697 | 11/1966 | May | 338/89 X |
| 3,316,765 | 5/1967 | Trolander et al. | 374/172 |
| 3,544,945 | 12/1970 | Leahy | 338/89 |
| 3,683,275 | 8/1972 | Fowler | 328/145 X |
| 3,727,129 | 4/1973 | Hummert | 324/132 X |
| 3,943,434 | 3/1976 | Haeusler et al. | 374/173 X |
| 4,044,600 | 8/1977 | Claxton et al. | 374/134 X |
| 4,117,722 | 10/1978 | Helmstetter | 374/171 |
| 4,282,753 | 8/1981 | Davidson | 374/173 |
| 4,341,227 | 7/1982 | Turner | |
| 4,493,565 | 1/1985 | Saka | 374/185 |
| 4,602,871 | 7/1986 | Hanaoka | 374/102 |
| 4,633,875 | 1/1987 | Turner | |
| 4,669,475 | 6/1987 | Turner | |
| 4,676,664 | 6/1984 | Anderson et al. | 374/136 |
| 4,682,099 | 7/1987 | Koken | 324/602 |
| 4,699,520 | 10/1987 | Wallenfang | 374/183 |
| 4,712,559 | 12/1987 | Turner | |
| 4,755,958 | 7/1988 | Mizuhara | 374/102 X |

FOREIGN PATENT DOCUMENTS 1006937  1/1982  U.S.S.R. .............. 374/171

OTHER PUBLICATIONS

S.I.R. Registration No. H562, published Dec. 6, 1988, An Accurate Electronic Thermometer, Trachier et al.
Vitek, Inc., Dec. 30, 1977, "Description of the 101 Electrothermia Monitor," 2 pages.
"Correction of Microwave-Induced Thermistor Sensor Errors", George M. Samaras, Samuel Rosenbloom and Augustine Y. Cheung, Medical Physics, vol. 10, No. 3, May/Jun. 1983, pp. 327-332.
"A Probe for Measuring Temperature in Radio-Frequency-Heated Material", Ronald R. Bowman, IEEE Transactions on Microwave Theory and Techniques, Jan. 1976, 3 pages.
"Hyperthermia Thermometry Evaluation: Criteria and Guidlines", P. N. Shrivastava, T. K. Saylor, A. Y. Matloubieh, and B. R. Paliwal, I. J. Radiation Oncology, Biology, Physics, Feb. 1988, vol. 14, No. 2, pp. 327-335.

Primary Examiner—Daniel M. Yasich
Attorney, Agent, or Firm—Robert F. O'Connell

[57] ABSTRACT

A technique for measuring temperature by a thermistor sensor which technique provides for a linearization of the temperature sensed by the thermistor by utilizing circuitry which responds to the thermistor and produces an output which is an exponential function of the temperature sensed by the thermistor. A further circuit, such as a logarithmic amplifier, responds to such output to provide a signal which represents the temperature.

14 Claims, 4 Drawing Sheets

TEMPERATURE MEASUREMENTS USING THERMISTOR ELEMENTS

The Government has rights in this invention pursuant to grant Number P01-CA31303 awarded by the National Institutes of Health.

INTRODUCTION

This invention relates generally to techniques for measuring temperature using thermistor elements and, more particularly, to a novel circuit arrangement using thermistor elements for providing linearization of the thermistor output at relatively low cost.

BACKGROUND OF THE INVENTION

Thermistor elements are very useful temperature sensing devices because of their high stablity, repeatability, and large temperature coefficient of resistance so that variations in the thermistor's resistance provide a relatively high sensitive temperature sensing operation. One of the problems in using thermistors, however, is that the relationship between the resistance thereof with temperature in a non-linear one, although such relationship is expressible by a known equation.

In order to make use of thermistors over a wide range of temperature variations it is been found effective to pre-determine the resistance-temperature relationship in accordance with such equation over a relatively wide range of temperatures and then to pre-store such resistance/temperature values in a memory look-up table of a data processing system. During use, a particular temperature can be readily obtained by determining the resistance of the thermistor element and having the data processor obtain the corresponding temperature from the look-up table.

Alternatively, the resistance-temperature equation can be implemented in software in a data processing system and the appropriate resistance supplied thereto so that the temperature can thereupon be computed by the data processing system in accordance with the software implemented equation.

While such data processing approaches provide good accuracy over wide temperature ranges, the output temperature information is provided on a discrete, e.g. non-continuous, basis and the resolution is only as good as the discrete values which are used either in the look-up table or in the software implementation of the equation. Moreover, such techniques require relatively expensive data processing hardware and software to make the necessary computations. Moreover, since the overall resistance/temperature relationship is non-linear, calibration procedures needed in such systems are necessarily more complicated than those needed when implementing linear relationships.

Another approach to making temperature measurements using thermistors is to provide a technique for essentially "linearizing" the relationship between the resistance and the temperature thereof, at least over a limited temperature range. It has been found that by placing the thermistor element in a suitably chosen resistor network, the output temperature response may be made relatively closely linear over a relatively limited temperature range. So long as the temperatures to be measured are confined to that limited range the output from the thermistor circuitry using the resistance network is a linear function of the thermistor resistance. Such an approach can use relatively simple and inexpensive electronic circuitry to convert the resistance measurement to a temperature value so as to provide continuous (non-discrete), analog temperature information. Moreover, such circuitry is relatively easy to calibrate. However, to provide a suitable design accuracy, the temperature range is, by necessity, relatively limited, e.g. such circuitry can provide an accuracy of 0.05° C. only over about a 10° C. range. Moreover, the presence of a resistive network causes the sensitivity of the thermistor to be substantially reduced. For example, the use of a linearizing shunt resistor can cause the sensitivity at the general midpoint of the measurement range to be reduced by as high as 80% with respect to the sensitivity without such a resistance and the signal level at the output can be reduced by almost 60%.

It is desirable to devise an approach utilizing thermistor elements for temperature measurements in which relatively simple circuitry can be used without the need for an expensive hardware and software implementation of the resistance-temperature relationship. Moreover it is desirable that such a technique be devised for providing accurate temperature measurements over a relatively wide range without a great loss in sensitivity.

BRIEF SUMMARY OF THE INVENTION

In accordance with the invention, a circuit is provided in which a non-linear temperature sensing element, such as a thermistor, has a substantially constant current supplied thereto and is arranged so as to effectively operate as a thermistor having a resistance in parallel therewith and a counter-voltage in series therewith. The circuit produces a voltage output which is a substantially exponential function of the temperature sensed by the thermistor and can be supplied to means, such as a logarithmic amplifier, to produce an output representing the temperature sensed by the thermistor. Such a circuit approach provides relatively high accuracy and can be calibrated using only one or two points rather than requiring calibration over a large number of points as is normally required for conventional thermistor circuits. In one embodient of the invention, for example, a relatively large shunt resistance is connected in parallel with a thermistor element and a further counter-voltage offset is connected in series with the thermistor element so that the relationship between the voltage output of the circuit and the temperature sensed by the thermistor element is substantially exponential. The voltage output from the circuit can be supplied to a logarithmic amplifier, for example, the output of which represents the temperature sensed by the thermistor element. Alternatively, other embodiments can be utilized in which the voltage output from the circuit is compared with the voltage output from a circuit having known exponential response characteristics, such as a resistance-capacitance circuit. The time over which the voltage output from the exponential circuit changes from its initial value to a value equal to the voltage output from the circuit thereby is linearly proportional to the temperature sensed by the thermistor element.

As a further alternative, the voltage resulting from the passage of current through the thermistor element can be supplied to a microprocessor, and the circuit which operates as the parallel resistance and a counter-voltage can be effectively simulated in the microprocessor. The microprocessor is suitably programmed to calculate, firstly, a value which is a substantially exponential function of the temperature sensed by the thermistor, and, secondly to perform a logarithmic function, or anti-exponential function, to calculate the temperature sensed by the thermister.

The technique of the invention provides a relatively high accuracy over a relatively wide temperature range. It has been found, for example, that accurancies to within 0.005° C., or better, over a temperature range of at least 20° C. can be achieved.

DESCRIPTION OF THE INVENTION

The invention can be described in more detail with the help of the accompanying drawing wherein.

A thermistor is a temperature-sensitive ceramic element whose resistance varies with temperature according to the following empirically determined relationship (sometimes referred to as the Steinhart-Hart equation);

$$1/T = A + B \ln R + C (\ln R)^3 \qquad (1)$$

where T is absolute temperature, R is resistance, A, B and C are constants, and ln is the natural logarithm. Such equation can be approximated as:

$$R = R_o e^{+\beta (1/T - 1/T_o)} \qquad (2)$$

where $R_o$ is the resistance at a temperature $T_o$ and $\beta$ is a material constant having the units °C. The temperature coefficient for the thermistor, i.e., the relative resistance change per degree Celsius temperature, is of the order of 4%. Such coefficient can be contrasted with the temperature coefficient for a platinum resistance element, for example, which is only about 0.4%/°C. Thus, thermistors have found relatively wide application for use as highly sensitive temperature measuring devices, particularly since they can be mass produced, have a relatively small size (dimensions of less than 1 mm.), and have a relatively wide range of variable nominal resistance from a few ohms to about 10 Mohms. Moreover the characteristics of such devices have good repeatability in production quantities (to within errors of less than 1%) and are useful over relatively wide temperature ranges (e.g. from −80° C. to +150° C.).

As mentioned above, one approach to utilizing such thermistors is to pass a small sensing current through the thermistor and to respond to the voltage (representing the resistance thereof) produced at the output of the thermistor element by implementing one of the above equations, either in the form of Eq. (1) or in the more approximate form of Eq. (2) in a data processor. Thus, the analog voltage from the thermistor is appropriately digitized using a suitable analog-to-digital (A/D) converter and the processor produces the value of the temperature in response thereto either by directly computing the temperature through the implementation of the equation in software or by utilizing a memory look-up table, wherein temperature values as a function of digitized voltage values are pre-stored therein. Such approaches have certain disadvantages in terms of the costs thereof, in the more complicated calibration procedures which are required and in the fact that such approaches cannot provide a continuous, i.e.. non-discrete measurement of temperature because of the digitized nature of the approach.

As also mentioned above, a thermistor circuit having a resistive network, or simply a shunt resistor in parallel with a thermistor element has been used to provide a linearization of the resistance-temperature curve over a relatively limited range but such approach has the disadvantages of reducing the sensitivity of the device and of being applicable only over very small temperature ranges.

Figure 1:
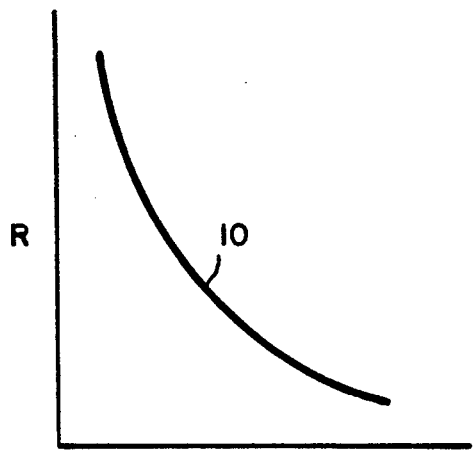
FIGS. 1 and 2 depict graphs of resistance-temperature curves helpful in understanding the invention.
Figure 2:
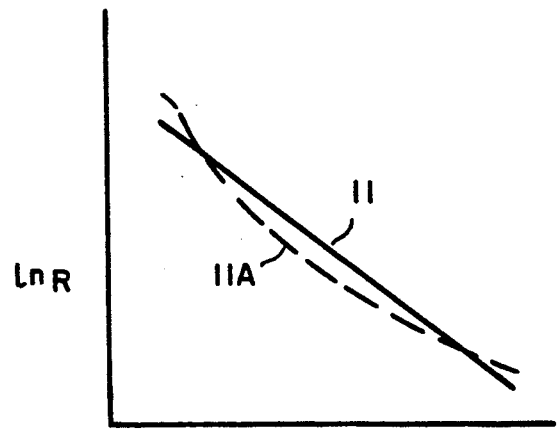
Figure 3:
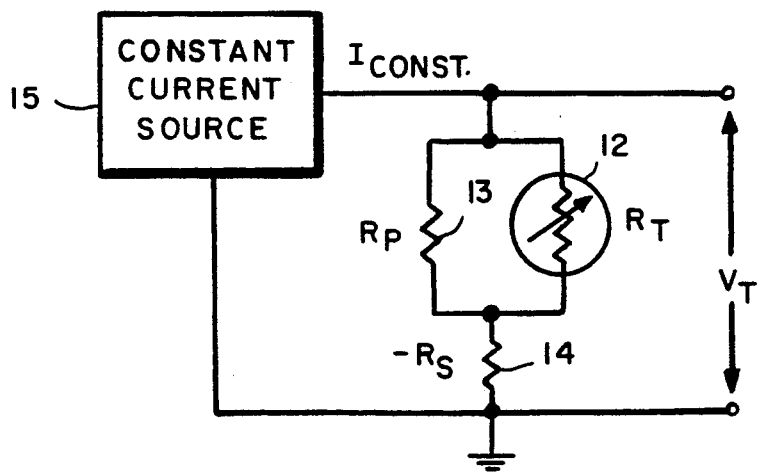
FIG. 3 depicts a partial block and partial circuit diagram of a particular embodiment of a portion of the invention.
Figure 4:
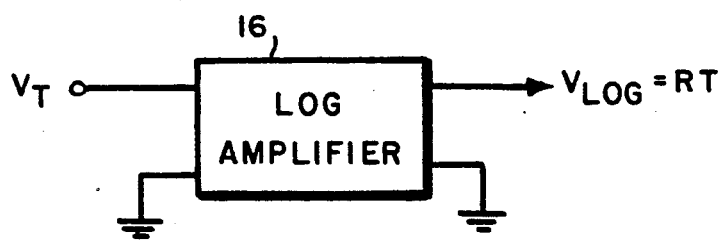
FIG. 4 depicts a partial block diagram of one embodiment of another portion of the invention.

A novel technique in accordance with the invention can be best understood by considering a typical curve of resistance vs. temperature for a conventional thermistor element. As can be seen qualitatively in FIG. 1, Eq. (2) set forth above approximately represents a decaying exponential curve 10. If the representation of lnR is shown graphically as a function of temperature T, it is seen that such a curve is relatively linear, as shown in FIG. 2. While the curve in FIG. 2 is shown as ideally linear, an actual curve may deviate slightly therefrom (shown exaggerated in FIG. 2 by the dashed line 11A). Eq. (2), however, is not a perfect exponential relation of R vs T, and accordingly is not a linear function of lnR vs T. However, it has been found in accordance with the invention that, by making some minor modifications, it is possible to obtain a more perfect exponential relation of R with T, or equivalently, a nearly perfect linear relation of lnR with T. These modifications may be performed in one embodiment of the invention by utilizing a circuit shown in FIG. 3 wherein a thermistor element 12 having a resistance $R_t$ has a shunt resistor 13 having a resistance $R_p$ in parallel therewith and an offset, or counter-voltage, in series with the thermistor. Such offset voltage can be obtained, for example, by using a negative resistance 14 having a resistance $-R_s$ in series therewith. A constant current source 15 supplies a substantially constant current $I_{const}$ to the circuit to produce a voltage output $V_T$ thereacross In effect, by using such a constant current source the output voltage from the circuit is directly proportional to the resistance of the circuit so that the relationship of the voltage output $V_T$ of the circuit to the temperature T of the thermistor element can be expressed as:

$$V_T = Ae^{-bT} \qquad (3)$$

which can be expressed in logarithmic terms as:

$$\ln V_T = \ln A - bT \qquad (4)$$

where $V_T$ is the voltage output of the circuit of FIG. 3, A is a constant, b is a constant, and T is the temperature sensed by the thermistor element. Thus, it can be seen from Eq. (4) that the log of the voltage output ($\ln V_T$) in the circuit of FIG. 3 is a linear function of the temperature T. Accordingly, if the output $V_T$ is supplied, for example, to a logarithmic amplifier 16, as shown in FIG 4, the voltage output $V_{log}$ from the logarithmic amplifier directly represents the temperature T as measured by the thermistor circuit of FIG. 3. The operation of the circuit of FIG. 4 can be appropriately calibrated at only two points for any particular thermistor since the logarithmic curve is substantially linear. The voltage output from the log amplifier 16 then directly represents the temperature for a particular thermistor element for which the circuit has been calibrated. Simple recalibrations can be made for other thermistor elements.

Moreover, since the conventional fabrication of thermistor elements normally provides thermistor characteristics having relatively good repeatability, particularly in terms of the shape of their resistance-temperature relationship, it may be possible to utilize such an approach in many applications without having to re-calibrate the circuitry for each different thermistor element which might be used therein, i.e., a single-temperature calibration could be sufficient to scale the entire response.

Figure 5:
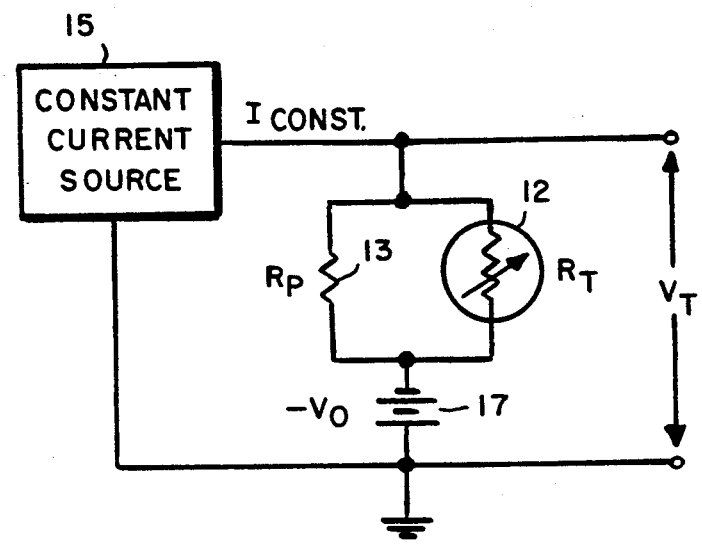
FIG. 5 depicts a partial block and partial circuit diagram of an alternative embodiment of the portion of the invention shown in FIG. 3.

As used in the circuit of FIG. 3, the series resistance 14 must have a negative resistance value to implement the desired log relationship. Such resistance can be implemented by using suitable negative resistance circuits, such circuits being well known to those in the art. An alternate technique for providing the offset voltage in series with the thermistor is to utilize a constant counter-voltage source 17 instead of a negative resistance, as shown in FIG. 5, wherein the negative resistance is replaced by a source supplying a constant counter-voltage, $-V_o$. The operation of the circuit of FIG. 5 is substantially the same as the operation of the circuit of FIG. 3 and provides the same voltage output $V_T$ as a function of circuit resistance as is provided by the circuit of FIG. 3 for supply to the logarithmic amplifier of FIG. 4, for example. The circuitry of both FIG. 3 and FIG. 5 as used with the log-amplifier of FIG. 4 provides a linear relationship between the output voltage from the log amplifier and temperature which can be calibrated at two points, as would be known to those in the art.

Figure 6:
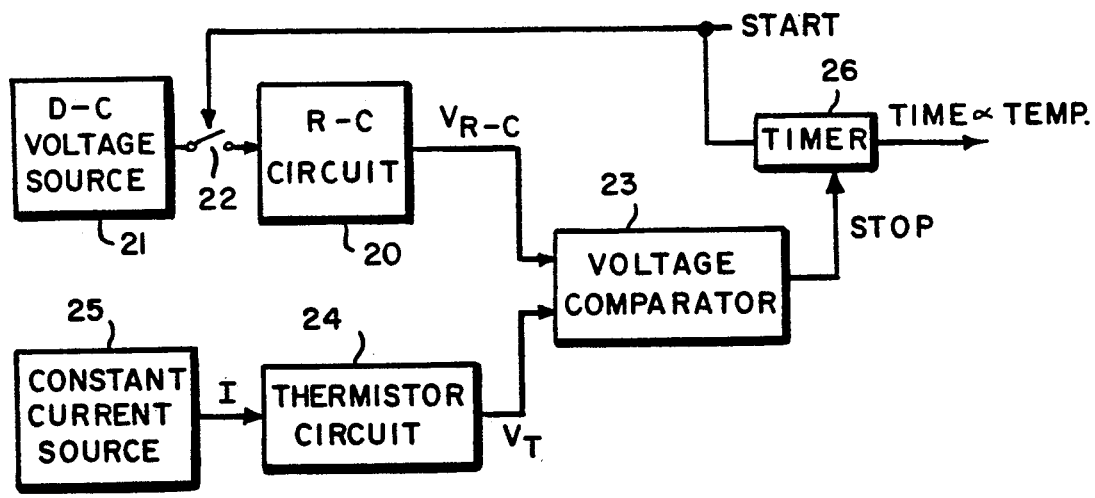
FIG. 6 depicts a block diagram of a further alternative embodiment of the invention.

A further alternative technique for making a temperature measurement in accordance with the invention which avoids the use of a logarithmic amplifier is shown in FIG. 6. As can be seen by the graph of FIG. 1, the exponential relationship between the resistance and temperature of a thermistor element is substantially equivalent to an exponential decay response of a voltage at the output of a resistance-capacitance (R-C) circuit. If a capacitor in an R-C circuit is charged to a particular voltage level and then is discharged through the resistance thereof, the discharge output voltage has substantially the same exponential decaying shape as the resistance-temperature characteristic of the circuits of FIGS. 3 and 5, as shown qualitatively in FIG. 1. Such substantially-similar operation can be used to provide temperature measurement circuitry such as shown in FIG. 6.

Thus, if the capacitance of an R-C circuit 20 is charged to a particular voltage from a D-C voltage source 21 through a closed gate, or switch, element 22, the circuit may be discharged by removing the voltage (i.e. opening switch 22) to permit the voltage output therefrom, $V_{R-C}$, to decay exponentially. Such voltage output is supplied as one input to a voltage comparator circuit 23 where it is compared with the voltage output from a thermistor circuit 24, such as shown by the exemplary circuits of FIG. 3 or FIG. 5. Circuit 24 is supplied by a constant current source 25 which produces an output voltage $V_T$ as the other input to voltage comparator 23. A timer 27 is started at the time that the gate, or switch, 22 is opened (when the discharge commences) and the input voltages to comparator 23 are compared until the voltage $V_{R-C}$ become equal to the voltage $V_T$, at which time an output is supplied from the comparator circuit to stop the timer 26. The time from which the R-C circuit begins its discharge operation (the time at which gate 22 is opened) until the time at which the output voltage from the R-C circuit equals the voltage from the thermistor circuit is thereby measured by timer 26 and is directly proportional to the temperature sensed by the thermistor in thermistor circuit 24. The timer output may have an analog form yielding a rising voltage during the release-and-compare period, after which it remains constant. This constant, or plateau voltage, after a sample-and-hold operation is directly calibratible at two points as a linear temperature output.

The approach of FIG. 6 may have an advantage over an approach of FIG. 4 utilizing a logarithmic amplifier since the accuracy of the logarithmic amplifier may not be as good as the accuracy of the timer, and the amplifier may be subject to drift problems over time, which drift needs to be compensated for in order to provide a voltage output which is an accurate representation of the temperature sensed by the thermistor.

Figure 7:
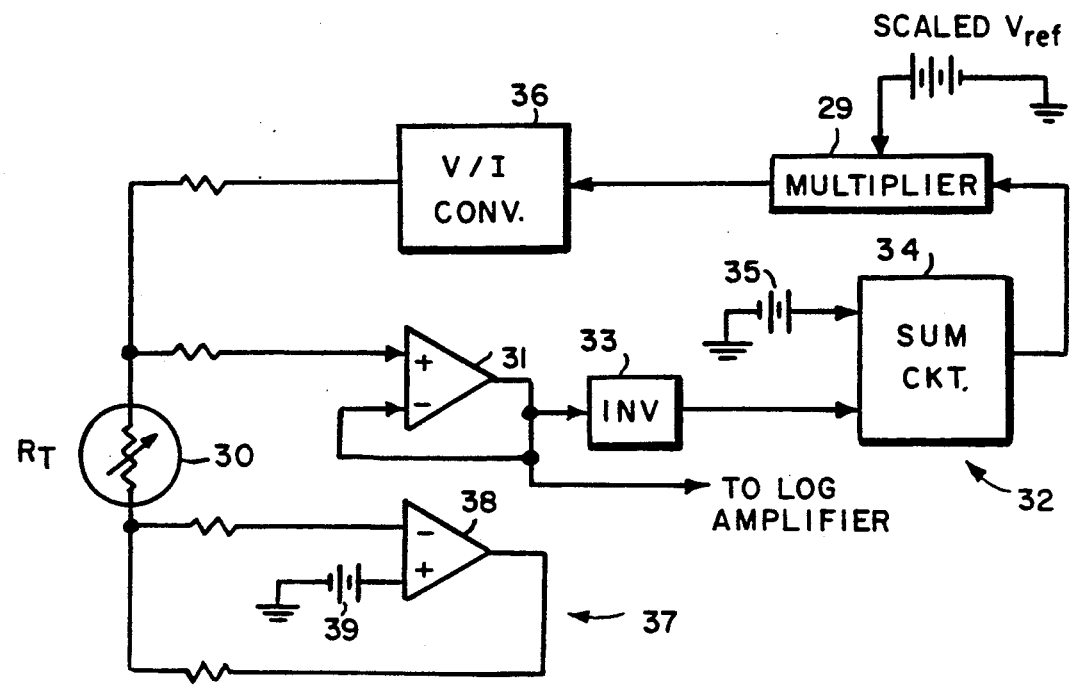
FIG. 7, depicts a block diagram of a further embodiment of the invention, using a 4-wire Kelvin thermistor connection mode.

Another embodiment of the invention is shown in FIG. 7 in which the parallel and series resistances of FIG. 3, for example, can be effectively embodied in circuitry which, for convenience, will require calibration at only a single point. As seen therein, a thermistor 30 is connected in a 4-wire Kelvin connection mode useful, for example, when using high resistance leads. The voltage from thermistor 30 is supplied to an operational amplifier (op-amp) 31 the output of which is supplied to a logarithmic amplifier (such as shown in FIG. 4). A parallel resistance is effectively represented by the circuit 32 which comprises an inverter 33 which responds to the output of op-amp 31, the inverted output being summed in summation circuit 34 with a voltage from a fixed d-c voltage source 35. The summed voltage output is multiplied by a scaled reference voltage value, $V_{ref}$, at a suitable multiplier 29 and supplied to a voltage-to-current converter 36 to supply the constant current to thermistor 30. The negative resistance is effectively supplied by circuit 37 which comprises an operational amplifier 38 having one input connected to thermistor 30 and the other input connected to a fixed d-c voltage offset source 39, as shown.

Figure 8:
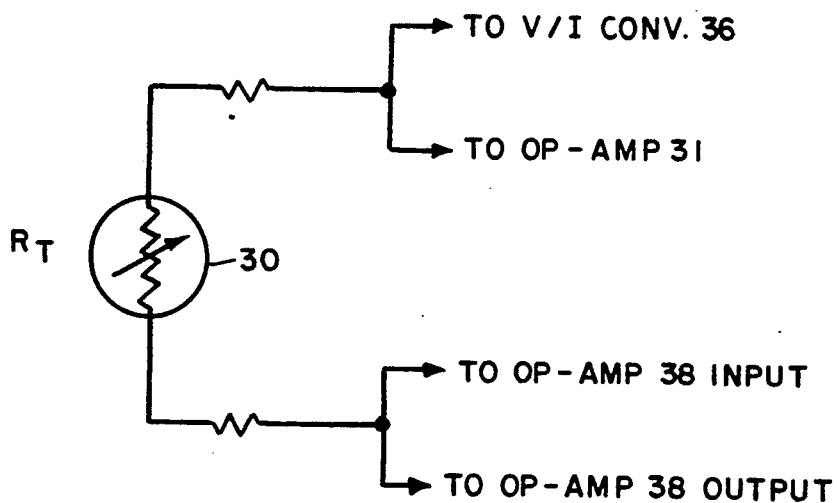
FIG. 8 depicts a circuit diagram depicting a two-wire thermistor connection mode for use in the embodiment of FIG. 7.

A 2-wire thermistor connection mode can be used when low-resistance leads are utilized by merely connecting the upper two leads together and the lower two leads together as shown in FIG. 8.

In accordance with FIG. 7, the thermistor is driven by a current source which is in turn driven by a calibration voltage which is reduced by the thermistor output voltage. Such operation effectively produces a psuedo-parallel resistance across the thermistor which is scaled to the thermistor resistivity at a reference temperature. The constant current through the pseudo-negative resistor (or fixed offset voltage) produces a negative resistance which is also scaled to the thermistor reference resistivity. The required parallel and series resistors in the thermistor circuit bear fixed ratio relationships with the mid-temperature thermistor resistance. These ratios vary slightly with the temperature bandwidth and mid-band temperature, and also with the thermistor composition (material and process dependent) which is very closely controlled. Thus, for any specific thermistor type (composition), and temperature range, these two constants will be invariant and need be entered into the measurement system only once. Thermistor dimension variations from production tolerances have no influence on these constants. For example, a high-resistance sensor would require only that the calibration voltage be reduced, which automatically increases the numerical values of the pseudo-parallel and pseudo-negative resistors by equal and appropriate factors. In this way calibration at only a single point is required. The scaled Vref on FIG. 7 maintains the required fixed scaling factors of parallel and series resistances corresponding to the thermistor mid-band temperature.

The relative ratiometric values of the effective parallel and series resistances remain essentially constant as scaled for a particular thermistor material. The temperature range should also be essentially constant. Basic calibration is achieved by adjusting the current source to a standard thermistor voltage at a standard temperature.

Figure 9:
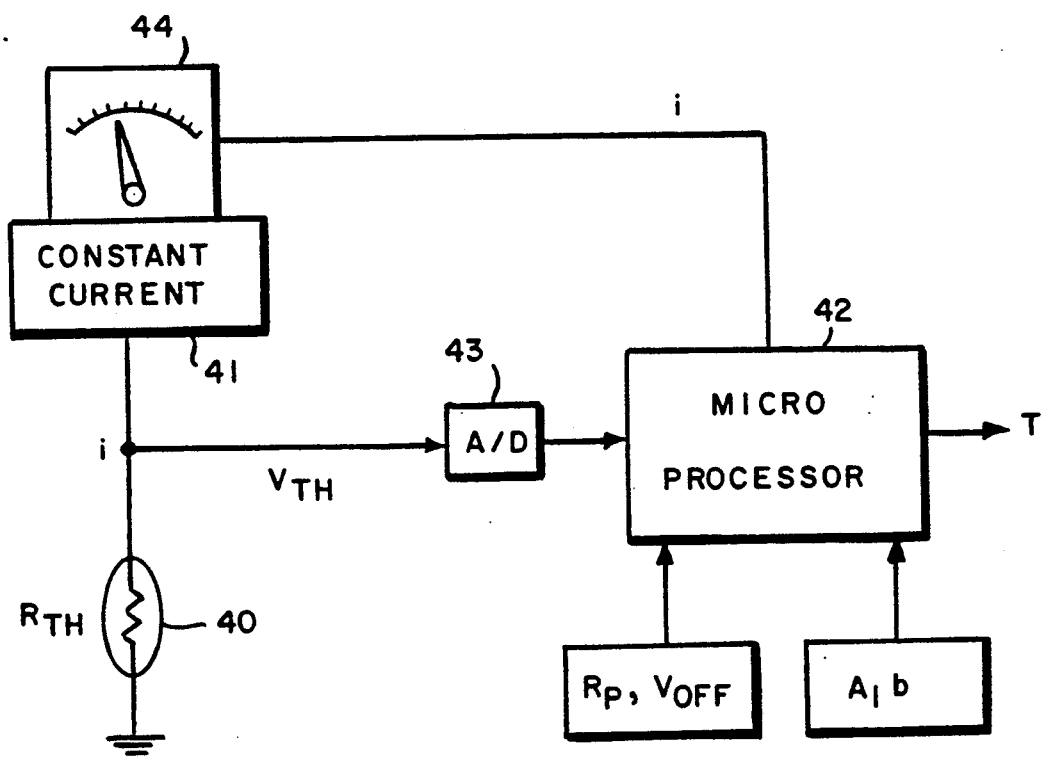
FIG. 9 depicts a block diagram of a still further embodiment of the invention using computer simulation techniques.

In a further alternative embodiment of the invention, the desired parallel resistance and series offset voltage circuitry can be effectively computer simulated rather than implemented by physical circuitry, of the type depicted in FIGS. 3 through 8. Such a simulated approach is shown in FIG. 9 wherein a thermistor 40 is supplied with a substantially constant current from a constant current source 41. The thermistor voltage $V_{TH}$ is supplied to a microprocessor 42 via an analog-to-digital (A/D) converter 43 for supply in digital form thereto. The current level through the thermistor is set by an appropriate control device 44 to a desired current level and the set current level i is supplied to the microprocessor. The desired digital values for the parallel resistance $R_p$ and the negative offset voltage $V_{off}$ (or equivalently $R_s$) and the constants A and b are also supplied to the microprocessor. The $R_p$ and $V_{off}$ (or equivalently $R_s$) inputs of FIG. 9 must be input to the microprocessor in such a way as to provide the required scaling of parallel and series components corresponding to the thermistor mid-band temperature. The voltage $V_T$ (i.e., the voltage of the simulated circuit, equivalent to the voltage $V_T$ in FIG. 3, for example) can be expressed as:

$$V_T = i \frac{R_{TH} R_p}{R_{TH} + R_p} + V_{off} \quad (5)$$

Where $R_{TH} = V_{TH}/i$. Further, since $V_T = Ae^{-bT}$, as set forth in

Eq. (3)

$$V_{off} + i \frac{R_{TH} R_p}{R_{TH} + R_p} = Ae^{-bT} \quad (6)$$

The microprocessor can be programmed to solve Eq. (6) for the temperature T in terms of the known or sensed quantities in the equation supplied to the microprocessor as shown in FIG. 9. Eqs. (5) and (6) can be expressed in terms of the series resistance Rs by replayig $V_{off}$ with Rs.

In effect, by solving Eq. (6), the microprocessor provides a simulation of the operation of the circuit of FIG. 3. The thermistor can be used in either a two-wire or a four-wire Kelvin connection for such purpose. The effect of simulating the operation of the parallel and series elements of the circuit produces the same result as if the actual circuit had been utilized. An advantage of the microprocessor approach is that the calculated value is a nearly perfect exponential function of temperature, as in Eq. (3), and again calibration of different thermistors can be accomplished by a simple one-or-two-point scaling calibration of the simulated components as opposed to the more complicated multi-point calibration of the prior art required in accordance with Eq. (1).

While the specific embodiments discussed above represent preferred exemplary embodiments of the invention, modifications thereto may occur to those in the art within the spirit and scope of the invention. Hence, the invention is not to be limited to the particular embodiments described, except as defined by the appended claims.

What is claimed is:

1. A temperature sensing system comprising
   non-linear temperature sensing means;
   a current source for providing a substantially constant current for said temperature sensing means;
   a circuit including a resistance means and a counter-voltage means, said temperature sensing means and said current source being connected in said circuit so that said resistance means is in parallel with said temperature sensing means and said counter-voltage means is in series with said temperature sensing means for producing an intermediate voltage output which is a substantially exponential function of the temperature sensed by said temperature sensing means.

2. A temperature sensing system in accordance with claim 1 wherein said temperature sensing means is a thermistor means.

3. A system in accordance with claim 2 wherein said counter-voltage means is a voltage source connected in series with said thermistor for providing a counter-voltage.

4. A system in accordance with claim 3 wherein said counter-voltage means is a negative-resistance means connected in series with said thermistor means for providing a counter-voltage.

5. A system in accordance with claim 3 wherein said voltage source is a D-C voltage source for providing a D-C voltage the sign of which is opposite to the sign of the D-C voltage drop across said thermistor means.

6. A system in accordance with claim 1 wherein said resistance means includes
   a first circuit connected to said thermistor means comprising voltage inverter means, voltage summation means, voltage multiplier means, and voltage-to-current means for providing an effective resistance in parallel with said thermistor means; and
   said counter-voltage means includes a second circuit connected to said thermistor means and comprising operational amplifier means for effectively producing a counter-voltage in series with said thermistor means.

7. A temperature sensing sysem in accordance with claim 6 wherein, in said first circuit, said inverter means is responsive to the voltage output of an operational amplifier connected to said thermistor means, said summation means is responsive to the voltage output of said inverter means and to a fixed voltage to produce a summed voltage output, said multiplier means is responsive to said summed voltage output for multiplying said summed voltage output by a scaling reference value, and said voltage-to-current converter means is responsive to the output of said multiplier for providing a temperature modified current to said thermistor means.

8. A temperature sensing system in accordance with claim 1 wherein said circuit includes a microprocessor for effectively providing a simulated circuit which includes a resistance in parallel with said thermistor means and a counter-voltage in series with said thermistor means, said microprocessor being programmed to provide a value representing the temperature sensed by said thermistor means in response to the voltage and the current at said thermistor means, to the values of said simulated parallel resistance and said series counter-voltage, and to selected constant values used in representing a substantially exponential relationship between the voltage output of said simulated circuit and the temperature sensed by said thermistor means.

9. A temperature sensing system in accordance with claim 8 wherein said microprocessor is programmed to compute the temperature value T in accordance with one of the following expressions:

$$V_{off} + i\frac{R_{TH}R_p}{R_{TH} + R_p} = Ae^{-bT}$$

or $$R_s + \frac{R_{TH}R_p}{R_{TH} + R_p} = A'e^{-bT}$$

where $R_{TH}$ is the resistance of the thermistor means, $R_p$ is the simulated resistance in parallel therewith, $V_{off}$ is the counter-voltage, $R_s$ is the series resistance, i is the current of said thermistor means, and A, A', and b are the selected constant values used in representing the exponential relationship between the voltage output of said simulated circuit and the temperature sensed by said thermistor means.

10. A system in accordance with claims 3, 4, 5, 6 or 7, wherein said output signal producing means comprises logarithmic amplifier means responsive to said intermediate voltage output for producing an output signal representing the temperature sensed by said thermistor means.

11. A system in accordance with claims 3, 4, 5, 6, or 7 wherein said output signal producing means includes;
means for providing an exponentially decaying output voltage beginning at a selected time;
means for producing an output timing signal representing the time period from the selected time at which said exponentially decaying voltage begins to the time at which the value of said exponentially decaying voltage is substantially equal to the immediate voltage output of said temperature sensing circuit, said output timing signal representing the temperature at said thermistor means.

12. A system in accordance with claims 3, 4, 5, 6, or 7 wherein said output signal producing means comprises;
a resistance-capacitance circuit;
means for charging the capacitance of said resistance-capacitance circuit to a selected charged voltage;
means for discharging the charged voltage at said resistance-capacitance circuit so as to produce an exponentially decaying output discharge voltage therefrom;
voltage comparator means for comparing the output discharge voltage from said resistance-capacitance circuit with the voltage output from said temperature sensing circuit; and
timing means responsive to said discharging means and to said voltage comparator means for providing an output timing signal representing the time period from the time at which said discharging means begins the discharging of the voltage at said resistance-capacitance circuit to the time at which the value of said output discharge voltage is substantially equal to the value of the intermediate voltage output from said temperature sensing circuit, said output timing signal representing the temperature sensed by said thermistor means.

13. A temperature sensing system comprising
non-linear temperature sensing means for sensing a temperature;
a current source for providing a substantially constant current to said non-linear temperature sensing means;
said non-linear temperature sensing means and said current source being connected in a circuit which includes further means connected to said temperature sensing means and responsive to the temperature sensed by said temperature sensing means, said temperature sensing means and said further means providing an intermediate output which is an exponential function of the temperature sensed by said temperature sensing means; and
means responsive to said intermediate output for producing an output signal which is a substantially linear function of said temperature sensed by said temperature sensing means.

14. A temperature sensing system in accordance claim 13 wherein said temperature sensing means is a thermistor means.

* * * * *